United States Patent
Yin (10) Patent No.: US 12,124,100 B2
(45) Date of Patent: Oct. 22, 2024

(54) LENS ASSEMBLY AND MOBILE TERMINAL

(71) Applicant: BEIJING XIAOMI MOBILE SOFTWARE CO., LTD., Beijing (CN)

(72) Inventor: Zhidong Yin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 705 days.

(21) Appl. No.: 17/356,340

(22) Filed: Jun. 23, 2021

(65) Prior Publication Data
US 2022/0317549 A1    Oct. 6, 2022

(30) Foreign Application Priority Data
Mar. 31, 2021 (CN) .......................... 202110351018.6

(51) Int. Cl.
G02B 7/02       (2021.01)
H04N 23/54    (2023.01)
H04N 23/55    (2023.01)
H04N 23/57    (2023.01)

(52) U.S. Cl.
CPC ............. G02B 7/021 (2013.01); H04N 23/54 (2023.01); H04N 23/55 (2023.01); H04N 23/57 (2023.01)

(58) Field of Classification Search
CPC ........ H04N 23/54; H04N 23/55; H04N 23/57; G02B 7/021; G02B 7/025; G03B 30/00; H04M 1/0264
See application file for complete search history.

(56) References Cited

U.S. PATENT DOCUMENTS

| 2017/0322397 A1* | 11/2017 | Lee .................. G02B 13/06 |
| 2020/0192051 A1* | 6/2020 | Wang .................. G02B 7/022 |
| 2020/0241244 A1 | 7/2020 | Chen |

FOREIGN PATENT DOCUMENTS

| CN | 207336891 U | 5/2018 |
| CN | 208432778 U | 1/2019 |
| CN | 209842189 U | 12/2019 |
| CN | 111741198 A | 10/2020 |
| JP | 2020511698 A | 4/2020 |
| KR | 20200127344 A | 11/2020 |
| WO | WO 2018198880 A1 | 11/2018 |
| WO | WO 2019228348 A1 | 12/2019 |
| WO | WO-2020200062 A1 * | 10/2020 |

OTHER PUBLICATIONS

European Patent Application No. 21181546.9 extended Search and Opinion dated Nov. 22, 2021, 6 pages.
Japanese Patent Application No. 2021-105955, Office Action dated Apr. 19, 2022, 4 pages.
Japanese Patent Application No. 2021-105955, English translation of Office Action dated Apr. 19, 2022, 5 pages.
Koren Patent Application No. 10-2021-0082992, Office Action dated Jan. 8, 2024, 7 pages.
Koren Patent Application No. 10-2021-0082992, English translation of Office Action dated Jan. 8, 2024, 7 pages.

\* cited by examiner

*Primary Examiner* — Twyler L Haskins
*Assistant Examiner* — John H Morehead, III
(74) *Attorney, Agent, or Firm* — Cozen O'Connor (57) ABSTRACT

A lens assembly and a mobile terminal incorporating a lens assembly include, a lens barrel, and the lens barrel includes a front lens barrel and a rear lens barrel arranged coaxially. A ratio of an outer diameter of a front end surface of the front lens barrel to an outer diameter of a front end surface of the rear lens barrel is within a predetermined range.

20 Claims, 6 Drawing Sheets

LENS ASSEMBLY AND MOBILE TERMINAL

CROSS-REFERENCE TO RELATED APPLICATION

This application is based upon and claims priority to Chinese Patent Application No. 202110351018.6, filed on Mar. 31, 2021, the entire contents of which are incorporated herein by reference.

FIELD

The present disclosure relates to a field of photographing technologies, and more particularly to a lens assembly and a mobile terminal.

BACKGROUND

Mobile terminals, such as mobile phones and tablet computers, experience continuous development. This development may include efforts towards both the integration of additional features, and miniaturization, both of individual components and the overall size of the mobile terminal. High integration and miniaturization put higher requirements on stacking of functional components, one of which may include a camera or other imaging devices with a photographing function.

However, a camera with the photographing function may occupy a large amount of space in a mobile terminal, which is not conducive to the miniaturization of the mobile terminal.

SUMMARY

According to a first aspect of embodiments of the present disclosure, a lens assembly is provided, including a lens barrel, and the lens barrel includes a front lens barrel and a rear lens barrel arranged coaxially. A ratio of an outer diameter of a front end surface of the front lens barrel to an outer diameter of a front end surface of the rear lens barrel is within a predetermined range.

According to a second aspect of the embodiments of the present disclosure, a mobile terminal is provided, including: a lens assembly; and an image sensor located on a light emitting side of the lens assembly and receiving light emitted from the light emitting side of the lens assembly. The lens assembly includes a lens barrel, and the lens barrel includes a front lens barrel and a rear lens barrel arranged coaxially. A ratio of an outer diameter of a front end surface of the front lens barrel to an outer diameter of a front end surface of the rear lens barrel is within a predetermined range.

BRIEF DESCRIPTION OF THE DRAWINGS

The accompanying drawings herein are incorporated in and constitute a part of the specification, show embodiments that conform to the present disclosure, and serve to explain principles of the present disclosure in conjunction with the specification.

DETAILED DESCRIPTION

Illustrative embodiments will be described in detail herein, with examples thereof represented in the drawings. When the following descriptions involve the drawings, same numerals in different drawings represent like or similar elements unless otherwise indicated. Implementations described in the following illustrative embodiments do not represent all implementations consistent with the present disclosure. Instead, they are merely examples of apparatuses and methods consistent with some aspects of the present disclosure as detailed in the appended claims.

Figure 1:
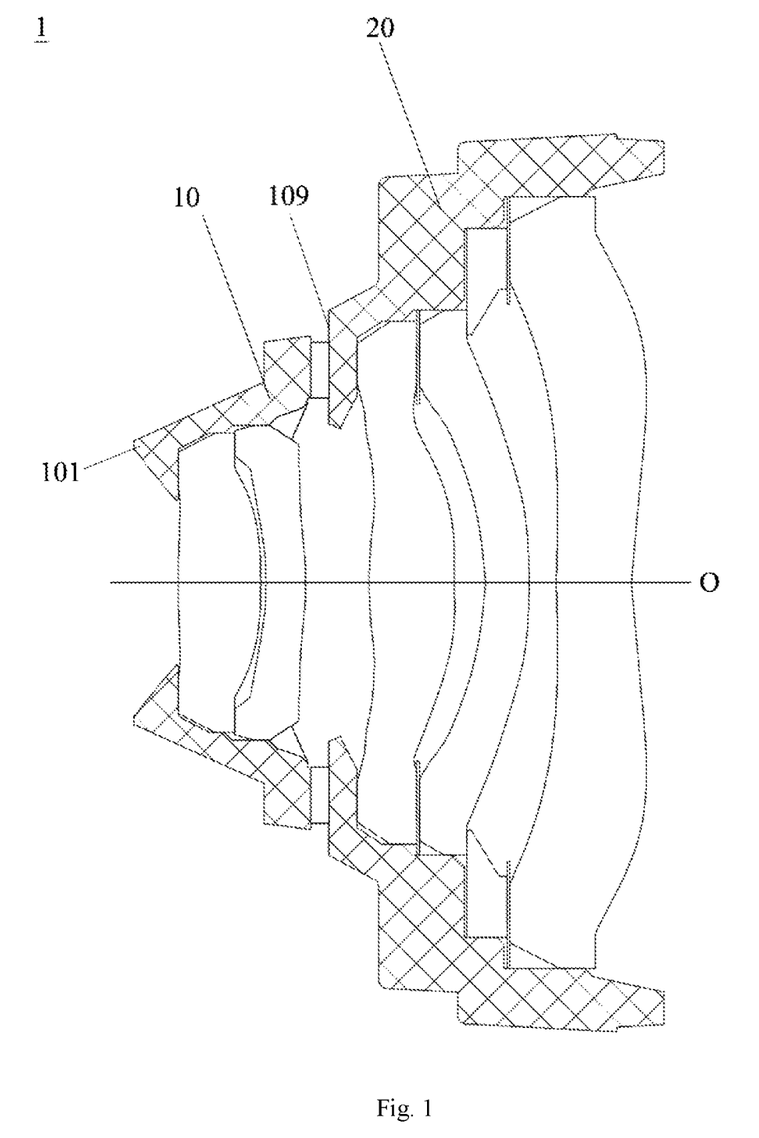
FIG. 1 is a sectional view of a lens assembly according to an illustrative embodiment of the present disclosure.
Figure 6:
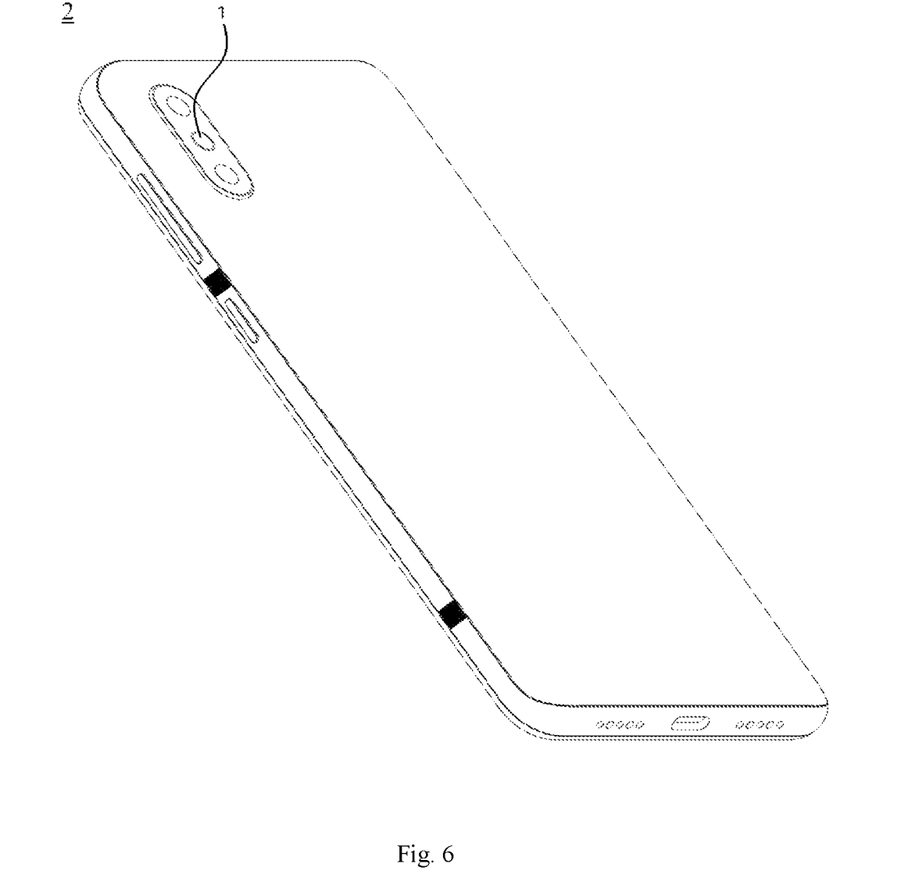
FIG. 6 is a schematic view of a mobile terminal according to an illustrative embodiment of the present disclosure.

FIG. 1 is a sectional view of a lens assembly according to an illustrative embodiment of the present disclosure. FIG. 6 is a schematic view of a mobile terminal according to an illustrative embodiment of the present disclosure.

An embodiment of the present disclosure provides a lens assembly 1 applicable to a mobile terminal 2. The mobile terminal 2 may be a smart phone, a tablet, a laptop, a wearable device such as a smart bracelet or a smart watch, a camera, a video camera and other electronic device with a photo-shooting or photographing function.

The lens assembly 1 is configured to collect an external light and refract and focus the external light to an image sensor inside the mobile terminal 2. For example, in use, a light from an object to be photographed is projected to the image sensor after being refracted and adjusted by the lens assembly 1, and the image sensor converts light information into digital information, which is then processed by a processor inside the mobile terminal and displayed on a screen.

In some embodiments, the lens assembly 1 may be used as a rear camera of the mobile terminal 2. In some other embodiments, the lens assembly 1 may be used as a front camera of the mobile terminal 2. One or more than one lens assembly 1 may be provided regardless of whether the lens assembly 1 is used as the front camera or the rear camera of the mobile terminal 2.

As shown in FIG. 1, the lens assembly 1 includes a lens barrel and a lens arranged in the lens barrel. The lens assembly 1 may include an object side and an image side. A side close to the object to be photographed is the object side and a side close to the image sensor is the image side.

The lens barrel includes a front lens barrel 10 and a rear lens barrel 20 arranged coaxially. A central axis of the front lens barrel 10 and a central axis of the rear lens barrel 20 are coaxial and coincide with an optical axis O of the lens assembly 1. The front lens barrel 10 and the rear lens barrel 20 may be separate structures or an integrated structure. The front lens barrel 10 and the rear lens barrel 20 may be made of a metal material or a resin material. A plurality of stepped annular bearing surfaces may be formed on inner walls of the front lens barrel 10 and the rear lens barrel 20 respectively, for bearing and matching various optical elements.

The front lens barrel 10 and the rear lens barrel 20 are each provided with at least one lens. The lens is configured to change a refraction path of the light and focus the light. The lens in the front lens barrel 10 closest to the rear lens barrel 20 may be fixed to the front lens barrel 10 by dispensing a glue. The lens may be a convex lens, a concave lens or a combination thereof. The lens may be a plastic lens or a glass lens.

Figure 2:
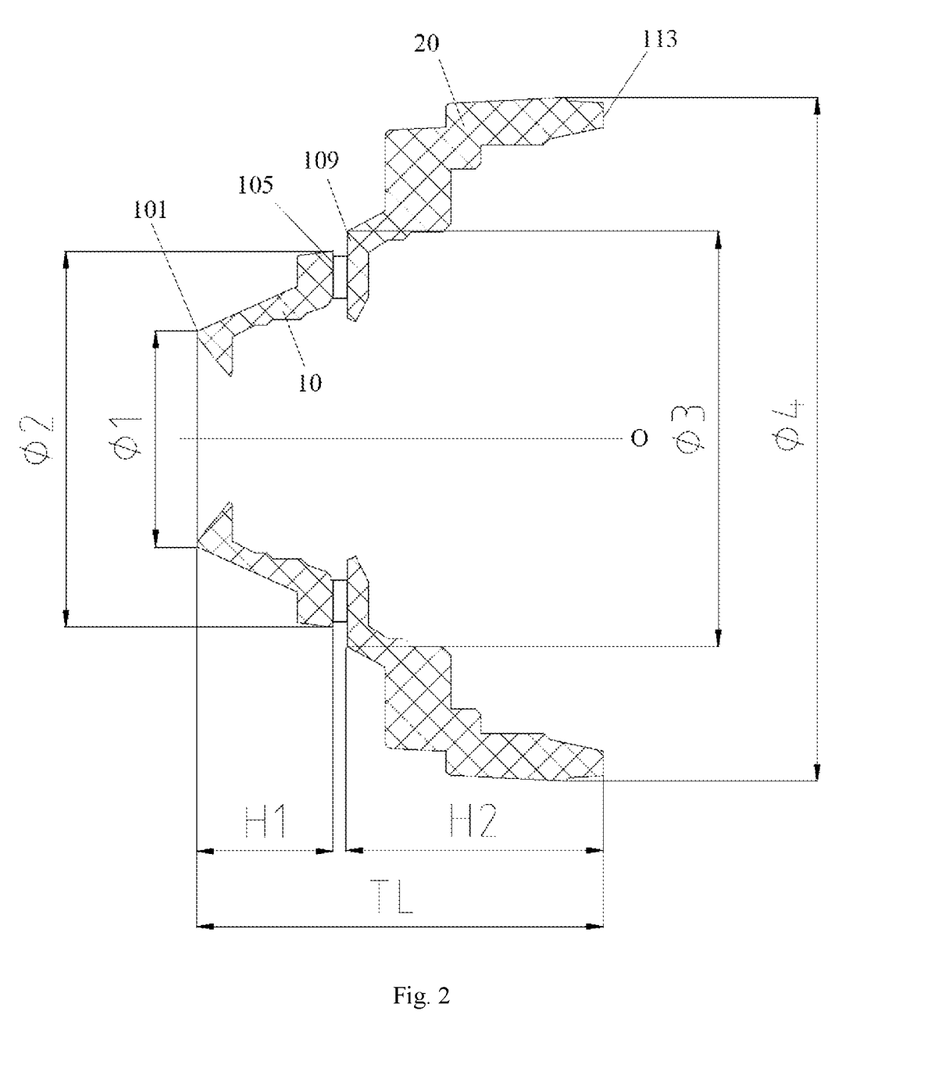
FIG. 2 is a sectional view of a lens barrel according to an illustrative embodiment of the present disclosure.

FIG. 2 is a sectional view of a lens barrel according to an illustrative embodiment of the present disclosure. As shown in FIG. 1 and FIG. 2, the front lens barrel 10 has a hollow structure, including a front end surface 101 and a rear end surface 105 coupled to each other. The front end surface 101 of the front lens barrel 10 is close to an object side of the front lens barrel 10. The rear lens barrel 20 also has a hollow structure, including a front end surface 109 and a rear end surface 113 coupled to each other. The front end surface 109 of the rear lens barrel 20 and the rear end surface 105 of the front lens barrel 10 may be fixedly connected by, but not limited to, a glue. The front end surface 109 of the rear lens barrel 20 and the rear end surface 105 of the front lens barrel 10 may be adsorbed and connected through a magnetic element. The light of the object to be photographed enters through an opening of the front end surface 101 of the front lens barrel 10, sequentially passes through an opening of the rear end surface 105 of the front lens barrel 10 and an opening of the front end surface 109 of the rear lens barrel 20, and is finally emitted from the rear end surface 113 of the rear lens barrel 20.

A ratio of an outer diameter $\phi1$ of the front end surface 101 of the front lens barrel 10 to an outer diameter $\phi3$ of the front end surface 109 of the rear lens barrel 20 is within a predetermined range. The outer diameter $\phi1$ of the front end surface 101 of the front lens barrel 10 is a maximum diameter of the front end surface 101 of the front lens barrel 10. The predetermined range is configured to control radial dimensions of the front end surface 101 of the front lens barrel 10 and the front end surface 109 of the rear lens barrel 20, so as to limit an overall size of the lens barrel. The outer diameter of the front end surface 101 of the front lens barrel 10 is a diameter of an outer wall of a forefront end of the front lens barrel 10, that is, a radial dimension of the forefront end (an end close to the object side of the lens assembly) of the front lens barrel 10. The outer diameter of the front end surface 109 of the rear lens barrel 20 is a diameter of an outer wall of a forefront end of the rear lens barrel 20, that is, a radial dimension of the forefront end (an end close to the object side of the lens assembly) of the rear lens barrel 20.

In the lens assembly 1 according to some embodiments of the present disclosure, internal structure dimensions (such as a length and a width) of the lens barrel accommodating the lens may be first determined based on optical parameters (such as a structure of one or more lenses) required by the lens assembly, and then an external dimension of the lens barrel is determined according to some corresponding dimension ratio ranges of the present disclosure, so as to minimize the overall size of the lens assembly. A size of a parameter of an outer surface of the lens barrel may also be determined first according to an assembling requirement, and then sizes of other parameters are adjusted according to the dimension ratio ranges.

In the present disclosure, the ratio of the radial dimension of the forefront end of the front lens barrel 10 to the radial dimension of the forefront end of the rear lens barrel 20 is limited to a certain range, so that a size of the entire lens barrel can be effectively controlled on a precondition that the lens assembly has the same optical parameter (a lens structure), which helps to miniaturize an overall structure of the lens assembly 1. When the lens assembly 1 is mounted to the mobile terminal 2, the occupation of the internal space of the mobile terminal 2 can be reduced, so as to provide convenience for the stacking and arrangement of other components, which is also conducive to the miniaturization of the mobile terminal 2.

In a scene where the lens assembly 1 is used as the front camera of the mobile terminal 2, a size of a head of the lens assembly 1 generally determines a size of a hole in the screen of the mobile terminal 2. Since the ratio of the radial dimension of the forefront end of the front lens barrel 10 to the radial dimension of the forefront end of the rear lens barrel 20 is controlled within the certain range, the head of the front lens barrel 10 can be well limited on a precondition that the lens assembly has the same optical parameter (the lens structure), which is conducive to the miniaturization of the front lens barrel 10, and also can help to reduce the hole in the screen and increase a screen-to-body ratio.

In an embodiment, as shown in FIG. 2, the ratio of the outer diameter of the front end surface 101 of the front lens barrel 10 to the outer diameter of the front end surface 109 of the rear lens barrel 20 satisfies a following relation: $0.2<\phi1/\phi3<1.0$, in which $\phi1$ denotes the outer diameter of the front end surface of the front lens barrel 10, and $\phi3$ denotes the outer diameter of the front end surface 109 of the rear lens barrel 20, i.e., a maximum diameter of the front end surface 109 of the rear lens barrel 20. A value range of one of $\phi1$ and $\phi3$ may be limited by a value of the other one of $\phi1$ and $\phi3$. For example, when $\phi3$ is a constant value, for example, $\phi3=2.92$ mm, the value of $\phi1$ can be determined in a certain range based on the above relation, so that the outer diameter $\phi1$ of the front end surface of the front lens barrel 10 is limited within this range, which helps to miniaturize a size of a front end of the lens assembly 1, thereby improving the screen-to-body ratio of the mobile terminal 2. As an example, the value of $\phi1$ may be 1.80 mm.

In an embodiment, the front lens barrel 10 is determined based on the outer diameter $\phi1$ of the front end surface 101 of the front lens barrel 10 and an axial length H1 of the front lens barrel 10. Radial and axial dimensions of the front lens barrel 10 may be determined based on the outer diameter $\phi1$ of the front end surface 101 and the axial length H1 of the front lens barrel 10, so that an overall size of the front lens barrel 10 can be determined. A range of a ratio of the outer diameter $\phi1$ to the axial length H1 is reasonably controlled, so that the structure of the front lens barrel can be effectively ensured to have a small size, which helps to reduce an end size of the lens assembly.

In an embodiment, the front lens barrel 10 satisfies a following relation: $0.8<(\phi2/\phi1)/H1<1.5$, in which $\phi2$ denotes an outer diameter of the rear end surface 105 of the front lens barrel 10, i.e., a maximum diameter of the rear end surface 105 of the front lens barrel, and H1 denotes the axial length of the front lens barrel 10. If one parameter of a difference between $\phi2$ and $\phi1$ and the axial length H1 of the front lens barrel 10 is a constant value, a range of the other parameter can be limited according to the above relation. This is conducive to controlling an overall size of the front lens barrel 10, so as to help to miniaturize the front lens barrel 10. For example, the values of $\phi2$ and $\phi1$ may be $\phi2=2.94$ mm and $\phi1=1.80$ mm, respectively, and the difference thereof is $\phi2-\phi1=1.14$ mm. A range of H1 may be determined based on the above relation. That is, the axial length H1 of the front lens barrel 10 is limited to a certain range, which helps to reduce the axial length of the front lens barrel 10. As an embodiment, the value of H1 may be H1=0.25 mm.

For another embodiment, the value of $\phi1$ may also be determined based on H1, that is, $\phi1$ may be limited to a certain range based on H1, which helps to reduce the outer diameter of the front end surface of the front lens barrel 10. In this way, when the lens assembly 1 is mounted to the mobile terminal 2 and used as the front camera, the hole in the screen can be reduced and the screen-to-body ratio can be increased. In short, an overall structure size of the front lens barrel 10 can be effectively reduced through the above relation on a precondition that the lens assembly 1 has the same optical parameter, which helps to miniaturize the lens assembly 1.

In another embodiment, the front lens barrel 10 satisfies a following relation: $1.5<\phi1/H1<2.5$. For example, the outer diameter $\phi1$ of the front end surface of the front lens barrel 10 may be a constant value, e.g., $\phi1=1.80$ mm. The axial length H1 of the front lens barrel 10 is limited to a certain range based on the above relation, which helps to reduce the axial length of the front lens barrel 10. When the lens assembly 1 is mounted to the mobile terminal 2, this helps to reduce the occupation of the thickness space of the mobile terminal 2, which is conducive to the ultra-thinness of the mobile terminal 2. As an embodiment, the value of H1 may be H1=0.25 mm.

Figure 3:
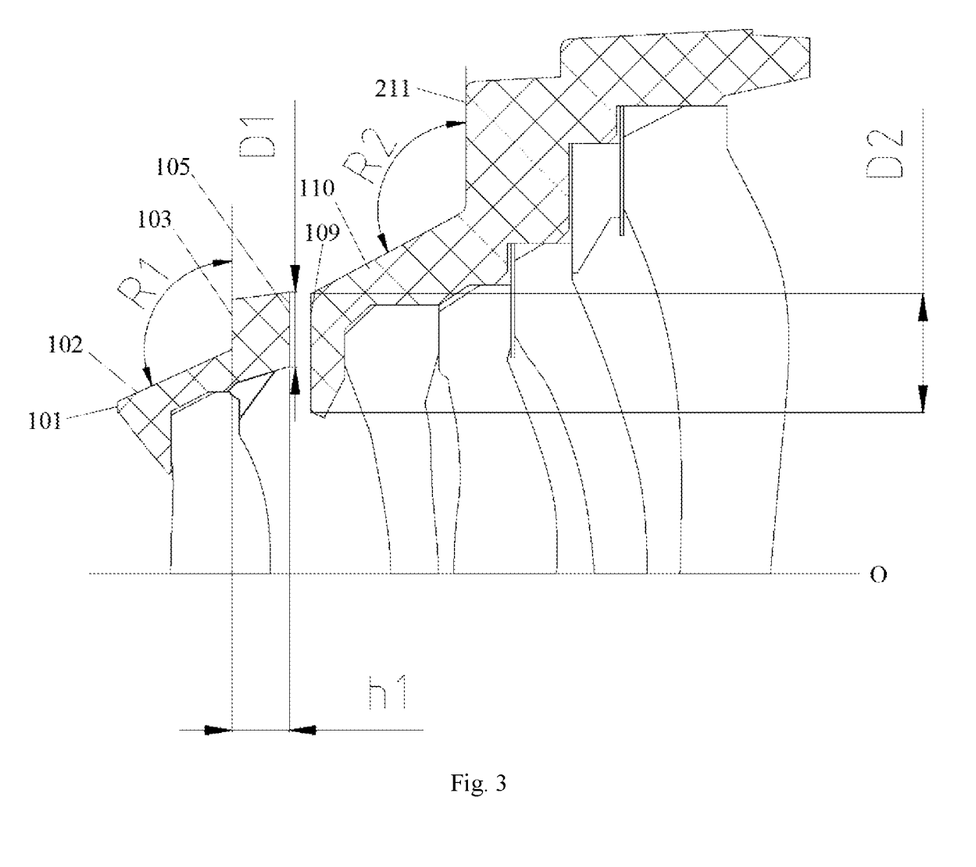
FIG. 3 is a partial sectional view of a lens assembly according to an illustrative embodiment of the present disclosure.

FIG. 3 is a partial sectional view of a lens assembly according to an illustrative embodiment of the present disclosure. In an embodiment, as shown in FIG. 3, the front lens barrel 10 includes a front inclined surface 102, and the front inclined surface 102 is connected to the front end surface 101 of the front lens barrel 10 and the rear end surface 105 of the front lens barrel 10. The front lens barrel 10 satisfies a following relation: $100°<R1<125°$, in which R1 denotes an included angle between the front inclined surface 102 and a plane perpendicular to an axial direction (the optical axis O) of the front lens barrel 10.

The front lens barrel 10 may have a tapered structure. An inner diameter (an opening diameter) of the front end surface 101 of the front lens barrel 10 is less than an inner diameter (an opening diameter) of the rear end surface 105 of the front lens barrel 10, so that an outer wall of the front lens barrel 10 forms the front inclined surface 102. In addition, the rear end surface 105 of the front lens barrel 10 extends outwards in a radial direction (a direction perpendicular to the optical axis O), so as to form a vertical surface 103 connected to the front inclined surface 102. An included angle between the front inclined surface 102 and the vertical surface 103 is R1. R1 is limited to the above range of 100° to 125°, so as to help to miniaturize a front end of the front lens barrel 10 and also make it easy to fit the front end of the lens assembly 1 with a mounting portion of the mobile terminal 2, which makes the mounting more convenient and facilitates a better connection with the rear lens barrel 20.

In some embodiments, as shown in FIG. 2 and FIG. 3, the rear lens barrel 20 is determined based on the outer diameter $\phi3$ of the front end surface 109 of the rear lens barrel 20.

In an embodiment, the rear lens barrel 20 satisfies a following relation: $1.0<\phi3/H2<2.0$, in which H2 denotes an axial length of the rear lens barrel 20. Since the outer diameter $\phi3$ of the front end surface 109 of the rear lens barrel is limited through the above relation by the outer diameter of the front end surface 101 of the front lens barrel 10, a radial length and an axis length of the rear lens barrel 20 may be limited based on a value range of the outer diameter $\phi3$ of the front end surface 109 of the rear lens barrel 20, which helps to miniaturize the rear lens barrel 20. If one parameter of $\phi3$ and H2 is a constant value, a range of the other parameter can be limited according to the above relation. This is conducive to controlling an overall size of the rear lens barrel 20, so as to help to miniaturize the rear lens barrel 20. For example, the value of $\phi3$ may be $\phi3=2.29$ mm. A range of H2 may be determined based on the above relation. That is, the axial length H2 of the rear lens barrel 20 is limited to a certain range, which helps to reduce the axial length of the rear lens barrel 20. As an embodiment, the value of H2 may be H2=2.62 mm. When the lens assembly 1 is mounted to the mobile terminal 2, this helps to reduce the occupation of the thickness space of the mobile terminal 2, which is conducive to the ultra-thinness of the mobile terminal 2.

In another embodiment, the rear lens barrel 20 satisfies a following relation: $0.3<\phi3/\phi4<1.0$, in which $\phi4$ denotes a maximum size of an outer diameter of the rear end surface 113 of the rear lens barrel 20. The value of $\phi3$ may be $\phi3=2.29$ mm. A range of $\phi4$ may be determined based on the above relation. That is, the maximum size of the outer diameter of the rear end surface of the rear lens barrel 20 is limited to a certain range, which helps to reduce a radial dimension of the rear lens barrel 20. As an embodiment, the value of $\phi4$ may be $\phi4=5.70$ mm. When the lens assembly 1 is mounted to the mobile terminal 2, this helps to reduce the occupation of the space of the mobile terminal 2, so as to provide more space for stacking of other components.

Radial dimensions of the front end surface 109 and the rear end surface 113 of the rear lens barrel 20 are controlled within a certain range on a precondition that the lens assembly 1 has the same optical parameter, which further helps to reduce an overall radial dimension of the rear lens barrel 20 to make the lens assembly 1 more miniaturized. This helps to reduce materials required by processing of the lens barrel and to decrease a volume of the lens assembly, improves the structure tightness and the assembling stability, and also, reduces the occupation of the internal space of the mobile terminal 2, so as to provide more space for stacking of other components.

Figure 4:
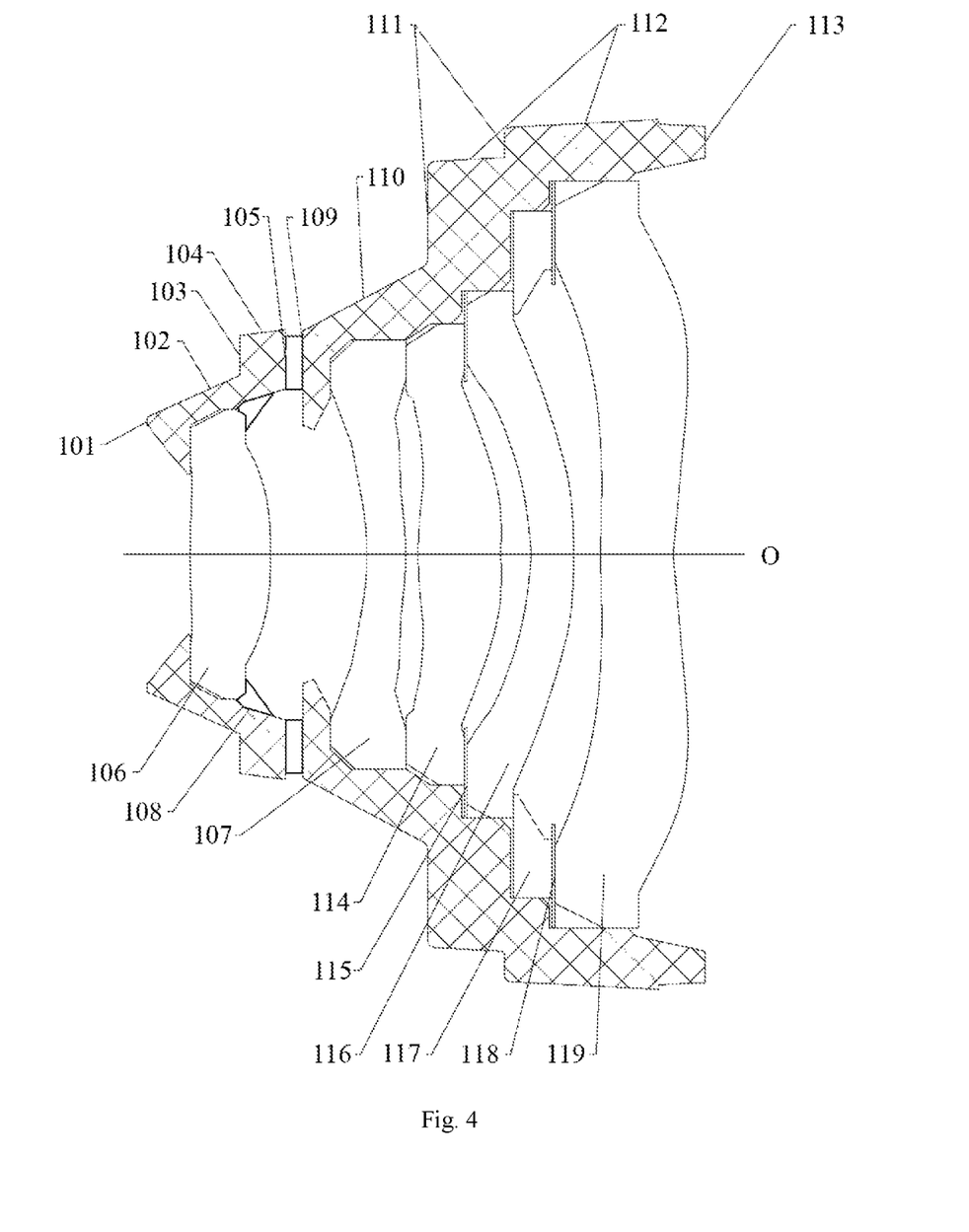
FIG. 4 is a sectional view of a lens assembly according to an illustrative embodiment of the present disclosure.

In some embodiments, as shown in FIG. 4, the rear lens barrel 20 includes a rear inclined surface 110 and a step surface, and the rear inclined surface 110 is connected to the front end surface 109 and the step surface of the rear lens barrel 20. The rear lens barrel 20 may have a tapered structure, and has a plurality of steps on an outer wall. The steps may be formed by two slightly inclined surfaces 112 and two vertical surfaces 111. The rear inclined surface 110 may be connected to the front end surface 109 and the forefront vertical surface 111 of the rear lens barrel 20. The step structure of the outer wall of the rear lens barrel 20 can effectively reduce a wall thickness of the rear lens barrel 20 and can also reduce material costs compared with a conventional straight-barrel structure.

In an embodiment, the rear lens barrel 20 satisfies a following relation: $105°<R2<130°$, in which R2 denotes an included angle between the rear inclined surface 110 and a plane perpendicular to an axial direction (a direction of the optical axis O) of the rear lens barrel 20. That is, R2 denotes an included angle between the rear inclined surface 110 and the forefront vertical surface 111. R2 is limited to the above range of 105° to 130°, which helps to miniaturize a front end of the rear lens barrel 20, facilitates a better connection with the front lens barrel 10, and helps to improve the accuracy of the connection with the front lens barrel 10.

In some embodiments, the lens barrel satisfies a following relation: $0.2<H1/H2<1.0$, in which H1 denotes the axial direction of the front lens barrel 10, and H2 denotes the axial length of the rear lens barrel 20. An overall axial length of the lens assembly 1 can be effectively reduced by controlling the axial lengths of the front and rear lens barrels within a certain range. When the lens assembly 1 is mounted to the mobile terminal 2, this helps to reduce the occupation of the thickness space of the mobile terminal 2, which is conducive to the ultra-thinness of the mobile terminal 2.

In some embodiments, the lens barrel satisfies a following relation: $0.3<\phi1/TL<0.8$, in which TL denotes a sum of the axial length of the front lens barrel 10 and the axial length of the rear lens barrel 20. The outer diameter $\phi1$ of the front end surface of the front lens barrel 10 and the overall radial dimension of the lens barrel are limited to a certain range, which helps to miniaturize the overall structure of the lens assembly and makes the lens assembly more compact.

In some embodiments, the front lens barrel 10 and the rear lens barrel 20 are arranged separately, that is, they are separate structures. The rear end surface 105 of the front lens barrel 10 is fixedly connected to the front end surface of the rear lens barrel 20. The rear end surface 105 of the front lens barrel 10 may be fixed to the front end surface 109 of the rear lens barrel 20 by a glue. With the separate structures of the front and rear lens barrels, simultaneous assembling is possible when the lenses are mounted to the front lens barrel 10 and the rear lens barrel 20, which can improve the assembling efficiency. Moreover, the lens is easily mounted, and the accuracy of the mounting position of the lens can also be improved. The lens assembly 1 has a good quality.

In an embodiment, as shown in FIG. 3, a rear end of the front lens barrel 10 extends radially outwards to form a boss. The boss includes a front end surface 103 and a rear end surface 105. The rear end surface 105 of the boss is the rear end surface of the front lens barrel 10, and may be fixed to the front end surface 109 of the rear lens barrel 20 by a glue. The boss of the front lens barrel 10 and the front end surface 109 of the rear lens barrel 20 satisfy a following relation: $0.3<D1/D2<0.8$, in which D1 denotes a radial width (e.g., a maximum width) of a cross section of the boss, i.e., a radial with of a cross section of the rear end surface 105 of the front lens barrel 10, and D2 denotes a radial width (e.g., a maximum width) of a cross section of the front end surface 109 of the rear lens barrel 20. This setting helps to control a contact area at a connection of the front lens barrel 10 and the rear lens barrel 20, so as to ensure the reliability of adhesion and fixation.

In an embodiment, as shown in FIG. 3, the boss of the front lens barrel 10 satisfies a following relation: $0.3<h1/D1<1.0$, in which h1 denotes an axial length (e.g., a maximum axial length) of a longitudinal section of the boss, that is, a distance from the front end surface 103 of the boss to the rear end surface 105 of the boss. The front end surface 103 may be a vertical surface. This setting helps to control a wall thickness of the front end surface 105 of the front lens barrel 10, so as to ensure the reliability of adhesion to the front end surface 109 of the rear lens barrel 20.

In some embodiments, the lens assembly satisfies a following relation: $FOV>90°$, in which FOV denotes a maximum field-of-view angle of the lens assembly 1. Through $FOV>90°$, the lens assembly 1 of the present disclosure has a wide-angle function, so as to obtain a wider viewing angle and a longer depth of field and take a wider picture with higher resolution. In conjunction with the size parameters of the lens barrel in any one of the above embodiments, the lens assembly 1 may be miniaturized on the premise of having the wide-angle function.

FIG. 4 is a sectional view of a lens assembly according to an illustrative embodiment of the present disclosure. As an embodiment, as shown in FIG. 4, the lens assembly 1 includes a lens barrel and at least one lens arranged in the lens barrel. The lens barrel includes a front lens barrel 10 and a rear lens barrel 20 arranged coaxially. The front lens barrel 10 has a hollow tapered structure, including a front end surface 101 and a rear end surface 105 coupled to each other. An inner diameter (an opening diameter) of the front end surface 101 of the front lens barrel 10 is less than an inner diameter (an opening diameter) of the rear end surface 105 of the front lens barrel 10, so that an outer wall of the front lens barrel 10 forms a front inclined surface 102. In addition, the rear end surface 105 of the front lens barrel 10 extends outwards in a radial direction (a direction perpendicular to the optical axis O), so as to form a vertical surface 103 connected to the front inclined surface 102. A slightly inclined surface 104 is connected between the vertical surface 103 and the rear end surface 105.

The rear lens barrel 20 also has a hollow structure, including a front end surface 109 and a rear end surface 113 coupled to each other. The front end surface 109 of the rear lens barrel 20 and the rear end surface 105 of the front lens barrel 10 may be fixedly connected by a glue. The rear lens barrel 20 further includes a rear inclined surface 110 and a step surface, and the rear inclined surface 110 is connected to the front end surface 109 and the step surface of the rear lens barrel 20. The rear lens barrel 20 may have a tapered structure, and has a plurality of steps on an outer wall. The steps may be formed by two slightly inclined surfaces 112 and two vertical surfaces 111. The rear inclined surface 110 may be connected to the front end surface 109 and the forefront vertical surface 111 of the rear lens barrel 20.

Five lenses are provided in the lens barrel, which are sequentially a first lens 106, a second lens 107, a third lens 114, a fourth lens 116 and a fifth lens 119 along the optical axis O. The first lens 106 is arranged in the front lens barrel 10, and is fixed in the front lens barrel 10 by a dispensed glue 108. The second lens 107, the third lens 114, the fourth lens 116 and the fifth lens 119 are arranged in the rear lens barrel 20. Each lens includes an effective diameter section and a non-effective diameter section. The non-effective diameter section is a peripheral section of the lens, which has no refraction effect on light and is configured to be connected and fixed to an inner wall of the lens barrel. The effective diameter section has a refraction effect on the light and is configured to focus the light. In addition, a first pad 115 may also be arranged between the non-effective diameter section of the third lens 114 and the non-effective diameter section of the fourth lens 116, an aperture 117 may be arranged between the fourth lens 116 and the fifth lens 119, and a second pad 118 is arranged between the aperture 117 and the fifth lens 119.

Figure 5:
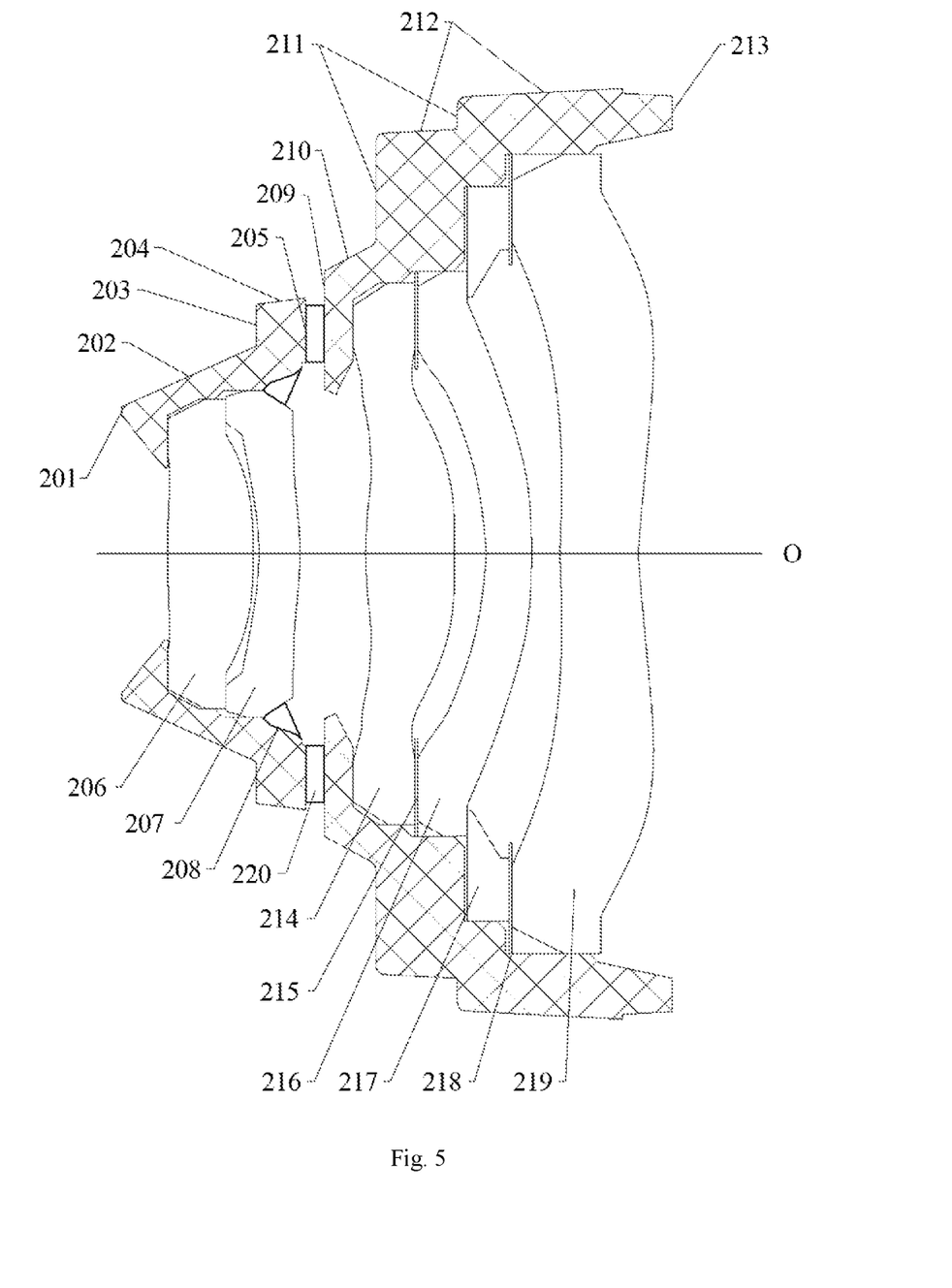
FIG. 5 is a sectional view of a lens assembly according to another illustrative embodiment of the present disclosure.

FIG. 5 is a sectional view of a lens assembly according to another illustrative embodiment of the present disclosure. As an embodiment, as shown in FIG. 5, the lens assembly 1 includes a lens barrel and at least one lens arranged in the lens barrel. The lens barrel includes a front lens barrel 10 and a rear lens barrel 20 arranged coaxially. The front lens barrel 10 has a hollow tapered structure, including a front end surface 201 and a rear end surface 205 coupled to each other. An inner diameter (an opening diameter) of the front end surface 201 of the front lens barrel 10 is less than an inner diameter (an opening diameter) of the rear end surface 205 of the front lens barrel 10, so that an outer wall of the front lens barrel 10 forms a front inclined surface 202. In addition, the rear end surface 205 of the front lens barrel 10 extends outwards in a radial direction (a direction perpendicular to the optical axis O), so as to form a vertical surface 203 connected to the front inclined surface 202. A plane connecting the vertical surface 203 with the rear end surface 205 is a slightly inclined surface 204.

The rear lens barrel 20 also has a hollow structure, including a front end surface 209 and a rear end surface 213 coupled to each other. The front end surface 209 of the rear lens barrel 20 and the rear end surface 205 of the front lens barrel 10 may be fixedly connected by a glue 220. The rear lens barrel 20 further includes a rear inclined surface and a step surface, and the rear inclined surface 210 is connected to the front end surface 209 and the step surface of the rear lens barrel 20. The rear lens barrel 20 may have a tapered structure, and has a plurality of steps on an outer wall. The steps may be formed by two slightly inclined surfaces 212 and two vertical surfaces 211. The rear inclined surface 210 may be connected to the front end surface 209 and the forefront vertical surface 211 of the rear lens barrel 20. Five lenses are also provided in the lens barrel, which are sequentially a first lens 206, a second lens 207, a third lens 214, a fourth lens 216 and a fifth lens 219 along the optical axis O. Each lens includes an effective diameter section and a non-effective diameter section. The non-effective diameter section is a peripheral section of the lens, which has no refraction effect on light and is configured to be connected and fixed to an inner wall of the lens barrel. The effective diameter section has a refraction effect on the light and is configured to focus the light. Differences are as follows. The first lens 206 and the second lens 207 are arranged in the front lens barrel 10, and the second lens 207 is closer to the rear lens barrel 20 and is fixed in the front lens barrel 10 by a dispensed glue 208. The third lens 214, the fourth lens 216 and the fifth lens 219 are arranged in the rear lens barrel 20. In addition, a first pad 215 may also be arranged between the non-effective diameter section of the third lens 214 and the non-effective diameter section of the fourth lens 216, an aperture 217 may be arranged between the fourth lens 216 and the fifth lens 219, and a second pad 218 is arranged between the aperture 217 and the fifth lens 219.

As an embodiment, in the two embodiments of FIG. 4 and FIG. 5, representative values of basic parameters of the lens barrel are shown in Table 1:

TABLE 1

| TL (mm) | FOV (°) | φ1 (mm) | φ2 (mm) | R1 (mm) | H1 (mm) | D1 (mm) | h1 (mm) | φ3 (mm) | φ4 (mm) | R2 (mm) | H2 (mm) | D2 (mm) |
|---|---|---|---|---|---|---|---|---|---|---|---|---|
| 3.64 | 93.0 | 1.80 | 2.94 | 112.0 | 0.90 | 0.35 | 0.25 | 2.92 | 5.70 | 116.0 | 2.62 | 0.62 |
| 3.37 | 96.0 | 1.80 | 3.13 | 115.0 | 1.12 | 0.39 | 0.30 | 3.46 | 6.50 | 120.0 | 2.13 | 0.72 |

As an embodiment, in the two embodiments of FIG. 4 and FIG. 5, representative values of the relations are shown in Table 2:

TABLE 2

| (φ2 − φ1)/H | φ1/φ3 | φ1/TL | φ1/H1 | H1/H2 | D1/D2 | φ3/H2 | h1/D1 | φ3/φ4 |
|---|---|---|---|---|---|---|---|---|
| 1.27 | 0.62 | 0.49 | 2.00 | 0.34 | 0.56 | 1.11 | 0.71 | 0.51 |
| 1.19 | 0.52 | 0.53 | 1.61 | 0.53 | 0.54 | 1.62 | 0.77 | 0.53 |

FIG. 6 is a schematic view of a mobile terminal according to an illustrative embodiment of the present disclosure. As shown in FIG. 6, a mobile terminal 2 is provided according to an embodiment of the present disclosure, including the lens assembly 1 according to any one of the above embodiments and an image sensor. The image sensor is located on a light emitting side of the lens assembly and configured to receive light emitted from the light emitting side of the lens assembly. The mobile terminal 2 may be a smart phone, a tablet, a laptop, a wearable device such as a smart bracelet or a smart watch, a camera, a video camera and other electronic devices with a photo-shooting or photographing function.

The image sensor is configured to receive an incident light reflected and focused by the lens assembly for imaging and to convert an optical image into an electrical signal. The image sensor may be a charge coupled device (CDD) or a complementary metal oxide semiconductor (CMOS).

With the lens assembly 1 of the present disclosure, the ratio of the radial dimension of the forefront end of the front lens barrel 10 to the radial dimension of the forefront end of the rear lens barrel 20 is limited to a certain range, so that a size of the entire lens barrel can be effectively controlled on a precondition that the lens assembly has the same optical parameter (the lens structure), which helps to miniaturize an overall structure of the lens assembly 1. When the lens assembly 1 is mounted to the mobile terminal 2, the occupation of the internal space of the mobile terminal 2 can be reduced, so as to provide convenience for the stacking and arrangement of other components, which is also conducive to the miniaturization of the mobile terminal 2.

Since the ratio of the radial dimension of the forefront end of the front lens barrel 10 to the radial dimension of the forefront end of the rear lens barrel 20 is controlled within a certain range, the head of the front lens barrel 10 can be well limited, which is conducive to the miniaturization of the front lens barrel 10, and also can help to reduce the hole in the screen and hence increase the screen-to-body ratio.

Through FOV>90°, the mobile terminal 2 of the present disclosure has the wide-angle function, so as to obtain the wider viewing angle and the longer depth of field and hence to take the wider picture with the higher resolution, and also features characteristics of miniaturization.

It may be further understood that "a plurality of" in the present disclosure means two or more than two, and other quantifiers are similar thereto. The term "and/or" describes an association relationship between associated objects, indicating that three relationships may exist. For example, A and/or B indicates that there are three cases of A alone, A and B together, and B alone. The character "/" generally means that associated objects before and after it are in an "or" relationship. The singular forms "a", "an", "the" and "this" are intended to include the plural forms as well, unless the context clearly indicates otherwise.

It may be further understood that, the terms such as "first" and "second" are used to describe various information, but the information should not be limited to these terms. These terms are used only to distinguish information of the same type from each other and do not indicate a particular order or degree of importance. In fact, expressions such as "first"

and "second" are completely interchangeable. For example, without departing from the scope of the present disclosure, first information may also be referred to as second information, and similarly, the second information may also be referred to as the first information.

It may be further understood that, the orientation or position relationship indicated by the terms such as "center", "longitudinal", "transverse", "front", "rear", "upper", "lower", "left", "right", "vertical", "horizontal", "top", "bottom", "inner", and "outer" are based on the orientation or position relationship shown in the accompanying drawings and are intended to facilitate the description of the present application and simplify the description only, rather than indicating or implying that the apparatus or element referred to must have a particular orientation or be constructed and operated in a particular orientation.

It may be further understood that, unless otherwise stated, "connection" includes a direct connection in which no other element exists between the two and an indirect connection in which other elements exist between the two.

It may be further understood that, in the embodiments of the present disclosure, although operations are depicted in the drawings in a particular order, this should not be understood as requiring that such operations be performed in the particular order shown or in a sequential order, or that all illustrated operations be performed, to achieve desirable results. In particular environments, multitasking and parallel processing may be advantageous.

After considering the specification and practicing the embodiments disclosed herein, those skilled in the art would easily conceive of other implementations of the present disclosure. The present disclosure is intended to cover any variation, use, or adaptive change of the present disclosure. These variations, uses, or adaptive changes follow the general principles of the present disclosure and include common knowledge or common technical means in the art that are not disclosed in the present disclosure. The specification and the embodiments are considered as merely illustrative, and the real scope and spirit of the present disclosure are pointed out in the following claims.

Understandably, the present disclosure is not limited to the precise structures described above and shown in the accompanying drawings, and various modifications and changes can be made without departing from the scope thereof. The scope of the present disclosure is limited only by the appended claims.

What is claimed is:

1. A lens assembly, comprising:
   a lens barrel comprising a front lens barrel and a rear lens barrel arranged coaxially,
   wherein a ratio of an outer diameter of a front end surface of the front lens barrel to an outer diameter of a front end surface of the rear lens barrel is within a predetermined range,
   wherein the ratio of the outer diameter of the front end surface of the front lens barrel to the outer diameter of the front end surface of the rear lens barrel satisfies a following relation:

$0.2 < \phi1/\phi3 < 1.0$, wherein $\phi1$ denotes the outer diameter of the front end surface of the front lens barrel, and $\phi3$ denotes the outer diameter of the front end surface of the rear lens barrel.

2. The lens assembly according to claim 1, wherein the front lens barrel is determined based on the outer diameter of the front end surface of the front lens barrel and an axial length of the front lens barrel.

3. The lens assembly according to claim 2, wherein the front lens barrel satisfies a following relation:

$0.8 < (\phi2-\phi1)/H1 < 1.5$, wherein $\phi2$ denotes an outer diameter of a rear end surface of the front lens barrel, and H1 denotes the axial length of the front lens barrel.

4. The lens assembly according to claim 2, wherein the front lens barrel satisfies a following relation:

$1.5 < \phi1/H1 < 2.5$, wherein H1 denotes the axial length of the front lens barrel.

5. The lens assembly according to claim 1, wherein the front lens barrel comprises a front inclined surface, and the front inclined surface is connected to the front end surface of the front lens barrel and a rear end surface of the front lens barrel, wherein the front lens barrel satisfies a following relation:

$100° < R1 < 125°$, where R1 denotes an included angle between the front inclined surface and a plane perpendicular to an axial direction of the front lens barrel.

6. The lens assembly according to claim 1, wherein the rear lens barrel satisfies a following relation:

$1.0 < \phi3/H2 < 2.0$, wherein H2 denotes an axial length of the rear lens barrel.

7. The lens assembly according to claim 1, wherein the rear lens barrel satisfies a following relation:

$0.3 < \phi3/\phi4 < 1.0$, wherein $\phi4$ denotes a maximum size of an outer diameter of a rear end surface of the rear lens barrel.

8. The lens assembly according to claim 1, wherein the rear lens barrel comprises a rear inclined surface and a step surface, and the rear inclined surface is connected to the front end surface and the step surface of the rear lens barrel.

9. The lens assembly according to claim 8, wherein the rear lens barrel satisfies a following relation:
   $105° < R2 < 130°$, wherein R2 denotes an included angle between the rear inclined surface and a plane perpendicular to an axial direction of the rear lens barrel.

10. The lens assembly according to claim 1, wherein the lens barrel satisfies a following relation:

$0.2 < H1/H2 < 1.0$, wherein H1 denotes an axial direction of the front lens barrel, and H2 denotes an axial length of the rear lens barrel.

11. The lens assembly according to claim 1, wherein the lens barrel satisfies a following relation:

$0.3 < \phi1/TL < 0.8$, wherein TL denotes a sum of an axial length of the front lens barrel and an axial length of the rear lens barrel.

12. The lens assembly according to claim 1, wherein the front lens barrel and the rear lens barrel are separate structures, and a rear end surface of the front lens barrel is fixedly connected to the front end surface of the rear lens barrel.

13. The lens assembly according to claim 12, wherein a rear end of the front lens barrel extends radially outwards to form a boss; and
    the boss and the front end surface of the rear lens barrel satisfy a following relation:

$0.3 < D1/D2 < 0.8$, wherein D1 denotes a radial width of a cross section of the boss, and D2 denotes a radial width of a cross section of the front end surface of the rear lens barrel.

14. The lens assembly according to claim 13, wherein the boss satisfies a following relation:

$$0.3<h1/D1<1.0,$$

wherein h1 denotes an axial length of a longitudinal section of the boss.

15. The lens assembly according to claim 1, further comprising:
at least one lens arranged in the front lens barrel and the rear lens barrel respectively,
wherein the lens in the front lens barrel closest to the rear lens barrel is fixed to the front lens barrel by dispensing a glue.

16. The lens assembly according to claim 15, wherein the lens assembly satisfies a following relation:

$$FOV>90°,$$

wherein FOV denotes a maximum field-of-view angle of the lens assembly.

17. A mobile terminal, comprising:
a lens assembly comprising a lens barrel, the lens barrel comprising a front lens barrel and a rear lens barrel arranged coaxially, wherein a ratio of an outer diameter of a front end surface of the front lens barrel to an outer diameter of a front end surface of the rear lens barrel is within a predetermined range; and
an image sensor located on a light emitting side of the lens assembly and receiving light emitted from the light emitting side of the lens assembly,
wherein the lens barrel satisfies a following relation:

$$0.2<H1/H2<1.0.$$

wherein H1 denotes an axial direction of the front lens barrel, and H2 denotes an axial length of the rear lens barrel.

18. The mobile terminal according to claim 17, wherein the ratio of the outer diameter of the front end surface of the front lens barrel to the outer diameter of the front end surface of the rear lens barrel satisfies a following relation:

$$0.2<\phi1/\phi3<1.0,$$

wherein $\phi1$ denotes the outer diameter of the front end surface of the front lens barrel, and $\phi3$ denotes the outer diameter of the front end surface of the rear lens barrel.

19. The mobile terminal according to claim 18, wherein the front lens barrel comprises a front inclined surface, and the front inclined surface is connected to the front end surface of the front lens barrel and a rear end surface of the front lens barrel, wherein the front lens barrel satisfies a following relation:

$$100°<R1<125°,$$

where R1 denotes an included angle between the front inclined surface and a plane perpendicular to an axial direction of the front lens barrel.

20. A lens assembly, comprising:
a lens barrel comprising a front lens barrel and a rear lens barrel arranged coaxially,
wherein a ratio of an outer diameter of a front end surface of the front lens barrel to an outer diameter of a front end surface of the rear lens barrel is within a predetermined range,
wherein the lens barrel satisfies a following relation:

$$0.3<\phi1/TL<0.8,$$

wherein TL denotes a sum of an axial length of the front lens barrel and an axial length of the rear lens barrel.

* * * * *